W. H. Wilson,
Harvester Rake.
No. 28,228
Patented May 8, 1860.
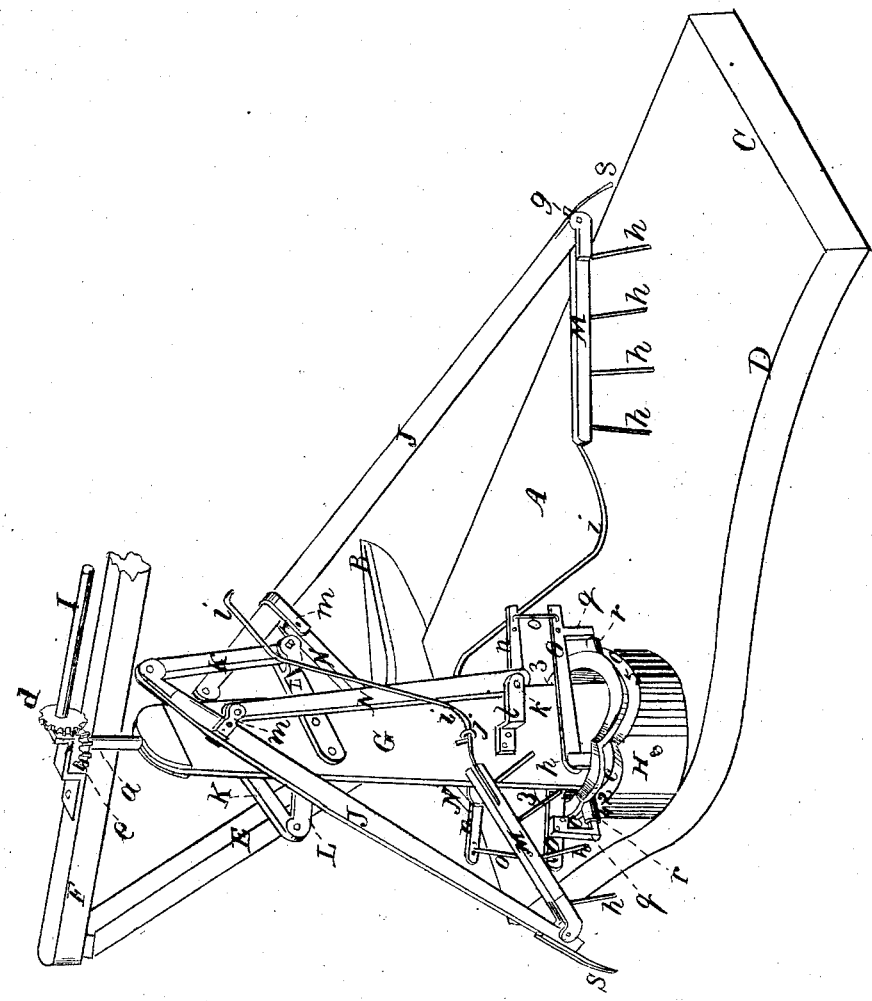
Witnesses.
E. Cohen
J. Hirsch
William H. Wilson
per atty A. B. Stoughton

UNITED STATES PATENT OFFICE.

WM. H. WILSON, OF DENTON, MARYLAND.

IMPROVEMENT IN AUTOMATIC RAKING APPARATUS FOR HARVESTERS.

Specification forming part of Letters Patent No. 28,228, dated May 8, 1860.

*To all whom it may concern:*

Be it known that I, WILLIAM H. WILSON, of Denton, in the county of Caroline and State of Maryland, have invented certain new and useful Improvements in Automatic Rakes for Reaping-Machines; and I do hereby declare the following to be a full, clear, and exact description of the construction and operation of the same, reference being had to the accompanying drawing, making a part of this specification, and which represents in perspective the raking apparatus complete, and so much of the platform of a harvesting-machine as will illustrate the position and operation of the rake in connection therewith.

My invention consists in the construction, location, and combination of a revolving reciprocating and tipping rake, with a platform that receives the cut grain, so that the rake, though revolving around a fixed center, shall reach out close to the outside front corner of the platform and entirely sweep it of the cut grain, and deliver it in gavels, near the rear inside corner of said platform, onto the ground, at right angles, or nearly so, to the path of the machine, as will be described.

A represents a platform, B being the outside divider thereof. The side C of the platform may be connected with the main frame of the harvesting-machine in any of the well-known ways, so as to leave a clear gaveling-space at or near the point D.

E is an outside brace or support for the outer end of the beam F, the inner end of said beam being supported by a brace rising from the main frame or inside of the platform, so as not to obstruct the clearing of the platform or the gaveling-space.

G is a revolving shaft or post, having journals $a$ at its top and bottom, which sit and turn in suitable boxes or bearings, and around the base of this shaft or post is arranged a cam, H, held by a nut or screw, or some other equivalent device, by which it may be turned to properly adjust its several "throws," or cam projections or depressions to cause the rake to traverse the platform with accuracy, and make its rising or tipping motions conform to its several requirements.

$c$ is a cam-slot near the top of the cam-ring H. This cam-slot has three projections, 1 2 3, upon it for changing the motion of the rake, the one 3 being behind the post G, and not seen in the drawings, and between these projections horizontal or curved ways, which also control the motion of the rake while its actuating-arm is traversing them, as will be described hereinafter.

The cam-cylinder H, I make as follows: I make two cylinders—an inner one and an outer one. The outer one has its cam on the upper edge of its shell. The inner one has a cam corresponding in outline with that on the outer shell, but formed by a projecting ledge, as seen in the drawing. These two cylinders are readily and easily molded and cast. The inner cylinder is placed inside of the outer one, so as to leave a uniform cam-slot between their two cam-edges. This done, pins or screws are passed through the cylinders, and the cam is ready. This construction of cam not only admits of its being easily cast, but also enables the workman to more easily get at and finish up the cam-surfaces.

I is a shaft, which may be driven by or from any moving part of the machine. It has upon its outer end a bevel-gear, $d$, which meshes with a similar bevel-gear, $e$, on the journal $a$ of the post G, and through this connection a uniform rotary motion may be given to the post G, and a clutch may be used to throw the gearing out when it is desirable for any purpose to stop the action of the rake.

The raking mechanism is connected with the revolving post and the stationary cam, as follows: A rake-arm, J, is connected at its upper end, through a link, K, to a brace or support, L, permanently secured on the post G. To the lower end of this rake-arm J is hinged, as at $g$, one end of the rake-head M, in which the rake-teeth $h$ are set, the opposite end of said rake-head having a bent rod, $i$, connected to it, which passes through a dead-eye or guide, $j$, on the post, the object of this rod being to keep that end of the rake down while it is sweeping the platform, and to allow it to rise after it has delivered the gavel on the ground. This guide-rod does not of necessity have to be fastened to the end of the rake-head or pass through the guide $j$. It may just as well connect anywhere with the rake-head, and have its guide in a more elevated position, which would remove it out of the way of any entanglement with the straws. An arm, N, is pivoted at $k$ to a brace or support, $l$, and the upper end of this arm N is pivoted to the rake-arm J at *m*. At the lower end of N there is a bell-crank lever, *n*, which is connected by a link, *o*, to a pivoted arm, O, that is hinged at *p* to the post G. An arm, *q*, carrying a friction-roller, *r*, is connected to the hinged arm O, and this roller runs in the cam-groove *c* and gives, through the above-named connections, motion to the rake. To disconnect or throw out of operation the rake, it is only necessary to unhook the link *o*, or to give the rake more or less sweep. This link *o* may be changed into adjusting-holes in the arms which it connects to give the rake greater or less motion. A finger, *s*, may be placed on the rake-shaft J, which projects to the extreme front and outside corner of the platform, so as to sweep the entire platform.

I have described but a single rake. It will be perceived that I have shown two—one upon each side of the post G. They are alike in every respect and only duplicate the operation of raking. In heavy grain two may be used. In lighter grain two may not be required. By unhooking the link *o* of either its operation is suspended. The rake or rakes, too, may be set nearer to the main frame, and they may turn in the other direction, if found necessary.

While the roller *r* is running upon the part 4 of the cam-groove the rake is sweeping the platform. When the roller comes to the throw 3 the rake is raised up and drawn in toward the post, so as not to strike against anything in rear of the machine. The throw 2 is for causing the rake to project farther along the front of the platform, at or near where it begins to turn and leave said front portion. While the roller is running upon the part 5 of the cam the rake is in rear of the platform and inactive, so far as raking is concerned; but so soon as the roller runs up the cam-plane toward 1 the rake reaches out to begin the clearing of the platform.

Having thus fully described the nature and object of my invention, what I claim therein as new, and desire to secure by Letters Patent, is—

Combining with a revolving post and a stationary cam a mechanism substantially such as herein described, whereby a rake connected to said post and cam shall have a revolving, reaching, and tipping motion, as herein set forth, to adapt it to the sweeping of the platform of the cut grain and delivering it in a compact gavel on the ground, as described and represented.

WM. H. WILSON.

Witnesses:
   A. B. STOUGHTON,
   E. COHEN.